United States Patent
Smith et al.

(10) Patent No.: US 10,690,352 B2
(45) Date of Patent: Jun. 23, 2020

(54) HEATING APPLIANCE

(71) Applicant: Spectrum Brands, Inc., Middleton, WI (US)

(72) Inventors: Jacob Daniel Smith, Madison, WI (US); Gerald Joseph McNerney, Middleton, WI (US); William James McClung, III, Belleville, WI (US); Casey Aaron Klock, Fitchburg, WI (US)

(73) Assignee: Spectrum Brands, Inc., Middleton, WI (US)

( * ) Notice: Subject to any disclaimer, the term of this patent is extended or adjusted under 35 U.S.C. 154(b) by 756 days.

(21) Appl. No.: 15/013,770

(22) Filed: Feb. 2, 2016

(65) Prior Publication Data

US 2016/0327280 A1 Nov. 10, 2016

Related U.S. Application Data

(60) Provisional application No. 62/110,960, filed on Feb. 2, 2015.

(51) Int. Cl.
| | |
|---|---|
| *F24C 7/08* | (2006.01) |
| *H05B 1/02* | (2006.01) |
| *F24C 7/04* | (2006.01) |
| *A47J 37/06* | (2006.01) |
| *F24C 15/32* | (2006.01) |
| *H05B 3/00* | (2006.01) |

(52) U.S. Cl.
CPC ........... *F24C 7/087* (2013.01); *A47J 37/0635* (2013.01); *A47J 37/0641* (2013.01); *F24C 7/046* (2013.01); *F24C 15/325* (2013.01); *H05B 1/0258* (2013.01); *H05B 3/0076* (2013.01)

(58) Field of Classification Search
CPC . A47J 37/0635; A47J 37/0641; F24C 15/325; F24C 7/087; H05B 1/0258; H05B 3/0076
USPC ....... 219/398, 400, 403, 412, 507, 395, 396, 219/397; 126/21 A, 21 R
See application file for complete search history.

(56) References Cited

U.S. PATENT DOCUMENTS

| | | | | |
|---|---|---|---|---|
| 3,073,938 A | * | 1/1963 | Roger | ..................... H01H 37/12 |
| | | | | 219/398 |
| 3,355,573 A | * | 11/1967 | Wilson | .................. A47J 37/042 |
| | | | | 219/396 |

(Continued)

FOREIGN PATENT DOCUMENTS

| KR | 100512533 B1 | 5/2005 |
|---|---|---|
| WO | 2011148170 A2 | 12/2011 |
| WO | 2013020162 A1 | 2/2013 |

OTHER PUBLICATIONS

Extended European Search Report for co-pending EP Application No. EP 1674122.6, 7 pages, dated Dec. 14, 2018.

*Primary Examiner* — Dana Ross
*Assistant Examiner* — Ket D Dang
(74) *Attorney, Agent, or Firm* — Kagan Binder, PLLC

(57) ABSTRACT

A heating appliance generally includes a housing having a compartment and a door for selectively accessing the compartment. The compartment is sized to receive a food product. The heating appliance also includes a heating element disposed within the compartment for cooking the food product, and a control unit for operating the heating element to cook the food product without preheating the compartment.

18 Claims, 12 Drawing Sheets

(56) References Cited

U.S. PATENT DOCUMENTS

| | | | | |
|---|---|---|---|---|
| 3,358,122 | A * | 12/1967 | Torrey | F24C 7/08 |
| | | | | 219/413 |
| 4,345,145 | A | 8/1982 | Norwood | |
| 5,296,683 | A * | 3/1994 | Burkett | F24C 7/087 |
| | | | | 219/411 |
| 5,432,321 | A * | 7/1995 | Gerl | F24C 7/087 |
| | | | | 219/413 |
| 5,528,018 | A * | 6/1996 | Burkett | F24C 7/087 |
| | | | | 219/413 |
| 6,011,242 | A | 1/2000 | Westerberg | |
| 6,201,222 | B1 * | 3/2001 | Baker | F24C 7/087 |
| | | | | 219/412 |
| 6,369,360 | B1 | 4/2002 | Cook | |
| 6,812,433 | B1 * | 11/2004 | Barritt | F24C 15/325 |
| | | | | 219/412 |
| 8,304,695 | B2 * | 11/2012 | Bonuso | F24C 15/325 |
| | | | | 126/21 A |
| 8,342,080 | B2 * | 1/2013 | Richardson | F24C 7/08 |
| | | | | 126/332 |
| 2003/0047553 | A1 | 3/2003 | Patti et al. | |
| 2004/0069155 | A1 | 4/2004 | Shei | |
| 2008/0023462 | A1 * | 1/2008 | Shei | A47J 39/006 |
| | | | | 219/394 |
| 2010/0006561 | A1 | 1/2010 | Hensel et al. | |
| 2011/0114627 | A1 * | 5/2011 | Burt | F24C 7/087 |
| | | | | 219/396 |
| 2012/0079948 | A1 * | 4/2012 | Nam | H05B 6/6476 |
| | | | | 99/331 |

\* cited by examiner

HEATING APPLIANCE

CROSS-REFERENCE TO RELATED APPLICATIONS

This application claims the benefit of U.S. Provisional Application No. 62/110,960 filed on Feb. 2, 2015, which is incorporated by reference herein in its entirety.

BACKGROUND

The present invention relates generally to appliances and, more particularly, to an appliance for heating a food product.

Many known heating appliances such as toaster ovens have a heating element and a rack mounted within a cavity for heating a food product placed on the rack. A door provides access to the cavity of the appliance for placing the food product on the rack, and a user-interface provides a user with control over the temperature of the air within the cavity and the duration for which the food product is heated.

However, at least some known heating appliances have various drawbacks, such as requiring lengthy preheating cycles, being complicated to operate, using excessive amounts of energy, failing to cook food in accordance with the suggested cook time provided on the food package, cooking food unevenly due to uneven heat distributions within the cavity, and/or relying on heated air inside the cavity to cook the food product. It would be useful, therefore, to provide an improved heating appliance.

SUMMARY

In one embodiment, a heating appliance generally comprises a housing having a compartment and a door for selectively accessing the compartment. The compartment is sized to receive a food product. The heating appliance also comprises a heating element disposed within the compartment for cooking the food product, and a control unit for operating the heating element to cook the food product without preheating the compartment.

In another embodiment, a heating appliance generally comprises a housing having a compartment and a door for selectively accessing the compartment. The compartment is sized to receive a food product. The heating appliance also comprises a radiant heating element disposed within the compartment. The heating element has a maximum rated power. The heating appliance further comprises a control unit operable to supply electrical current to the heating element so as to selectively power the heating element at a fraction of rated power.

In yet another embodiment, a heating appliance generally comprises a housing having a compartment and a door for selectively accessing the compartment. The compartment is sized to receive a food product. The heating appliance also comprises a radiant heating element disposed within the compartment, and a user-interface for receiving a cook time input and a cook temperature input from a user. The heating appliance further comprises a control unit operable to select an amount of electrical current supplied to the heating element for cooking the food product within the cook time.

BRIEF DESCRIPTION

Figure 1:
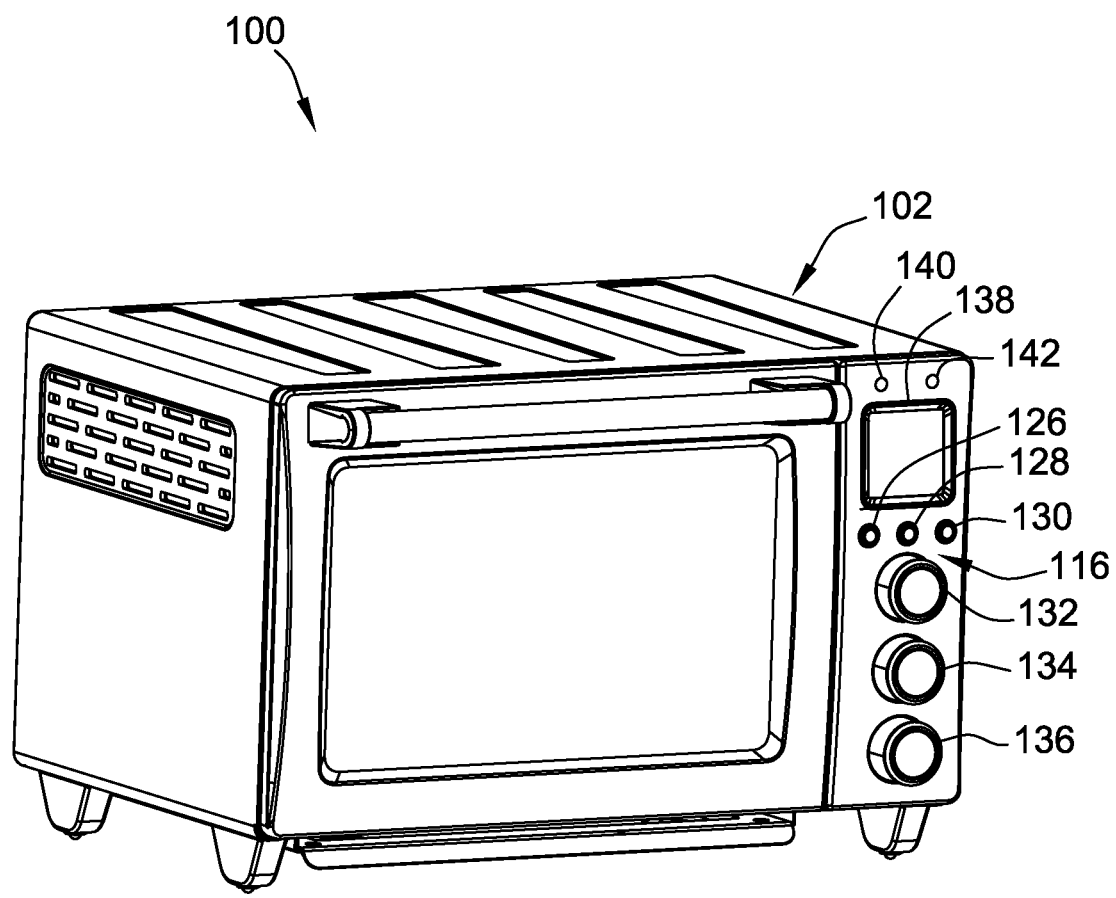
FIG. 1 is a perspective view of one embodiment of a heating appliance.
Figure 4:
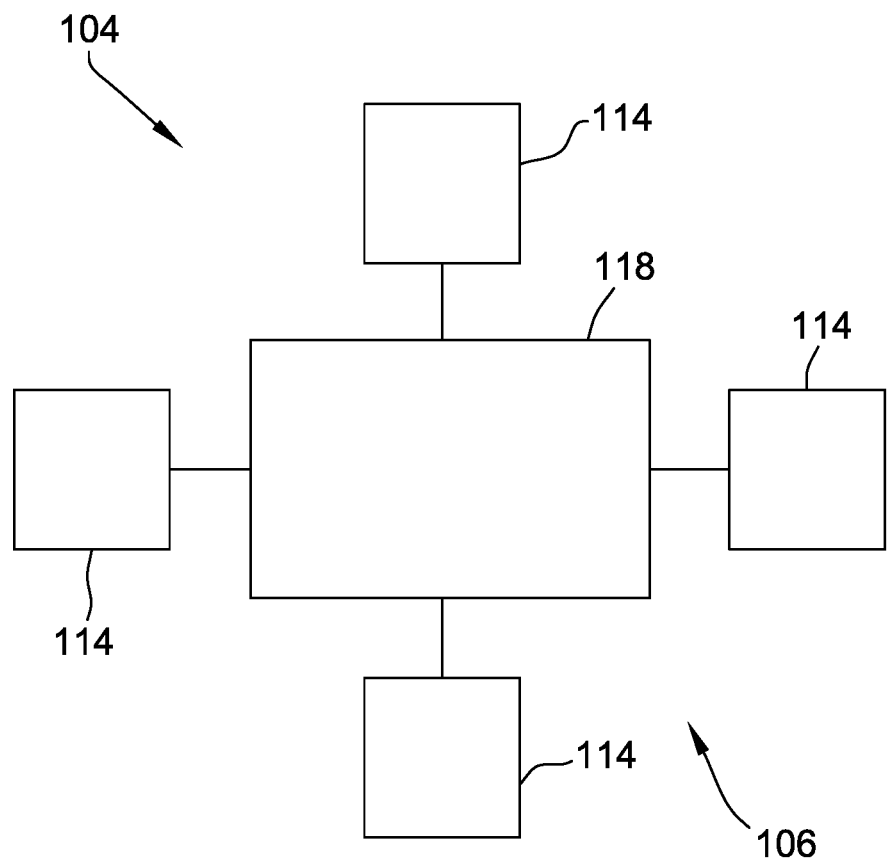
FIG. 4 is a schematic illustration of a control unit of the appliance shown in FIG. 1 operatively connected to a plurality of heating elements of the appliance.
Figure 6:
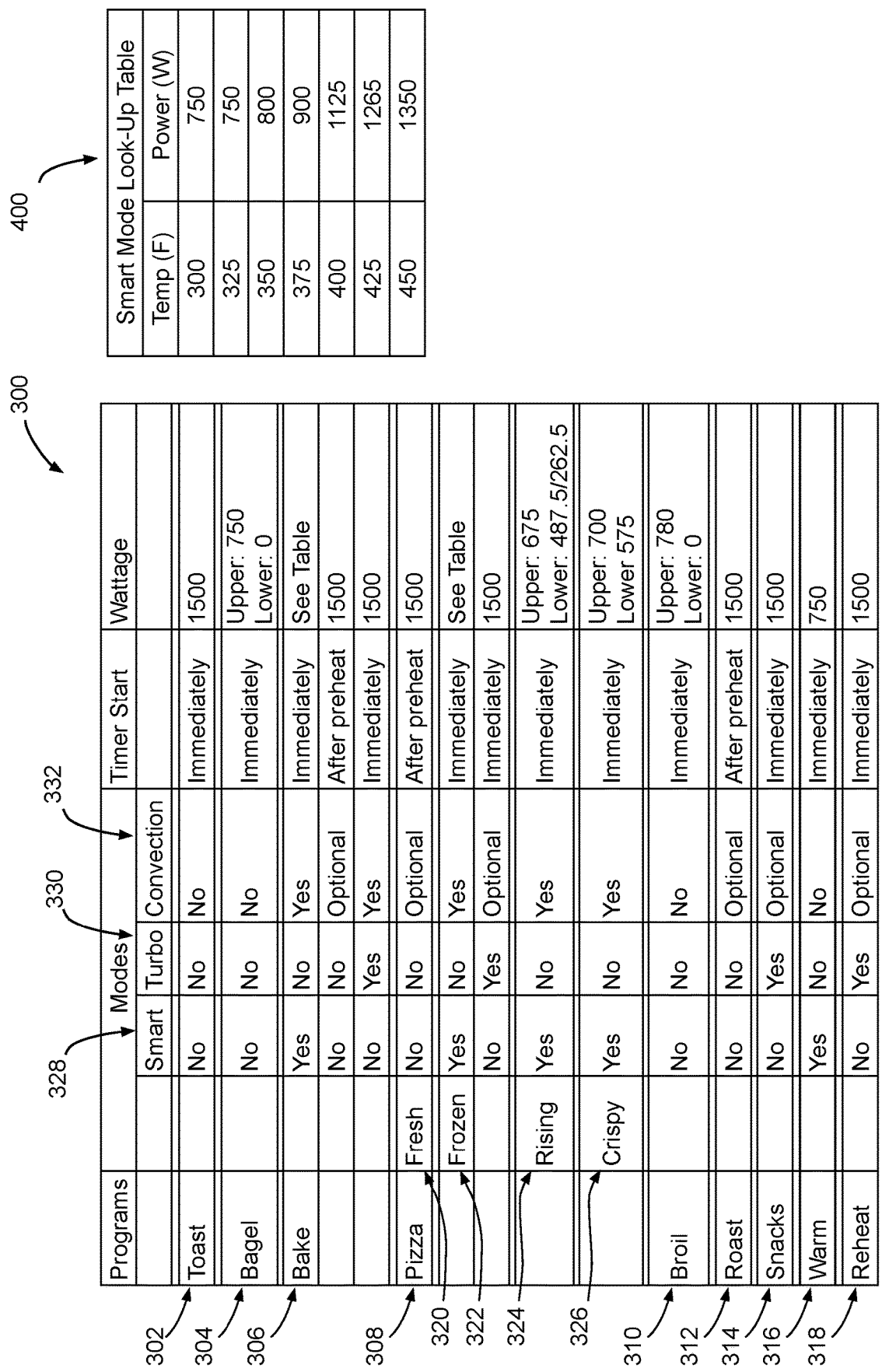
Figure 7A:
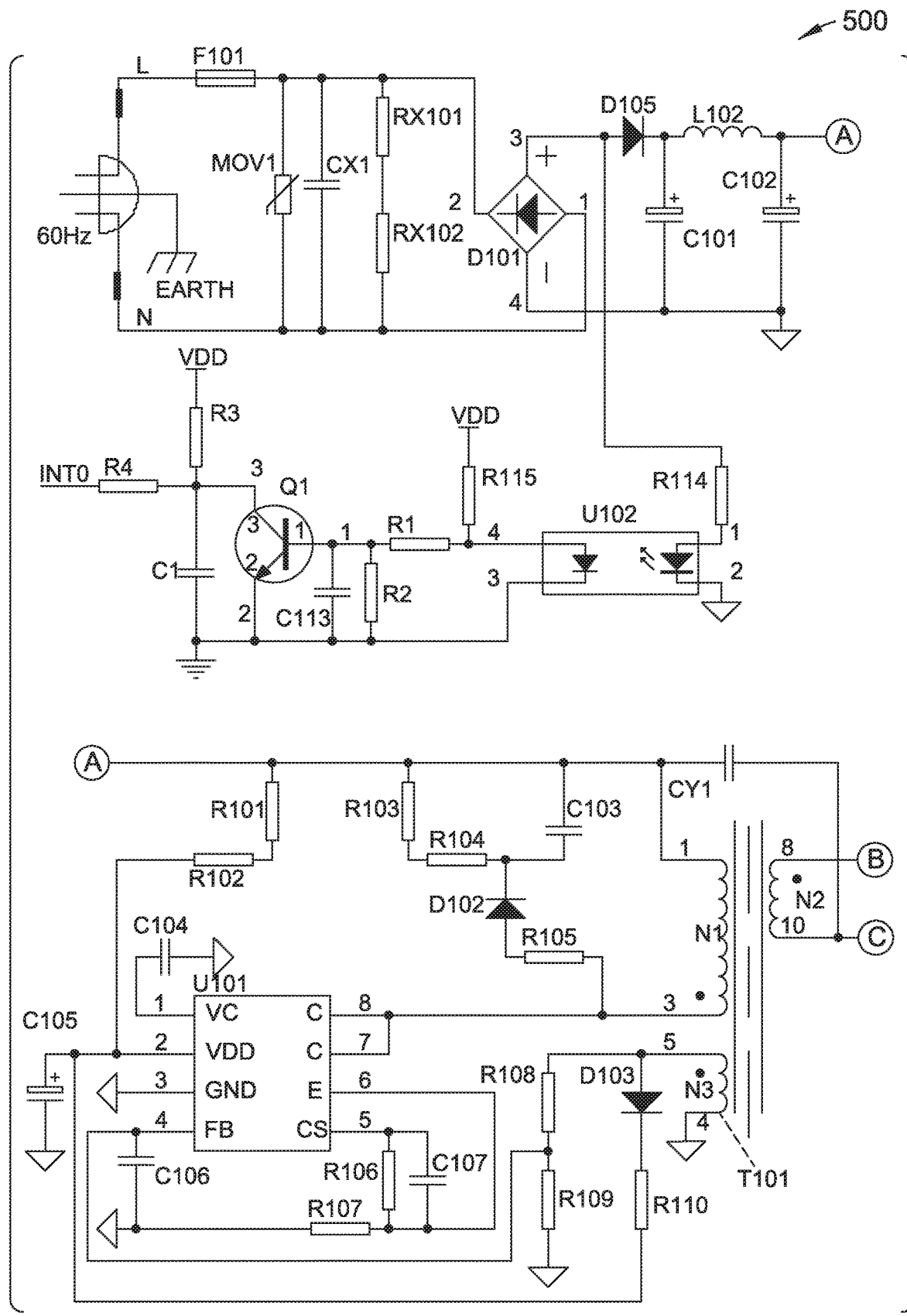
Figure 7B:
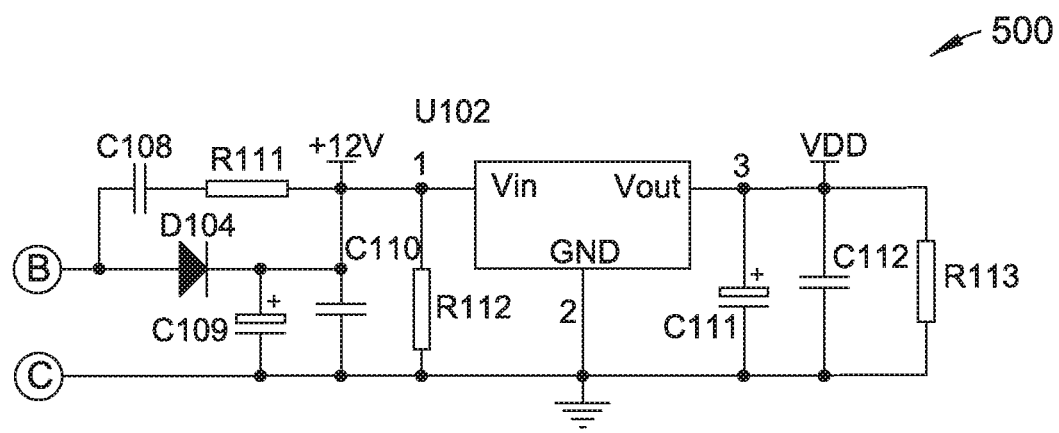
Figure 7C:
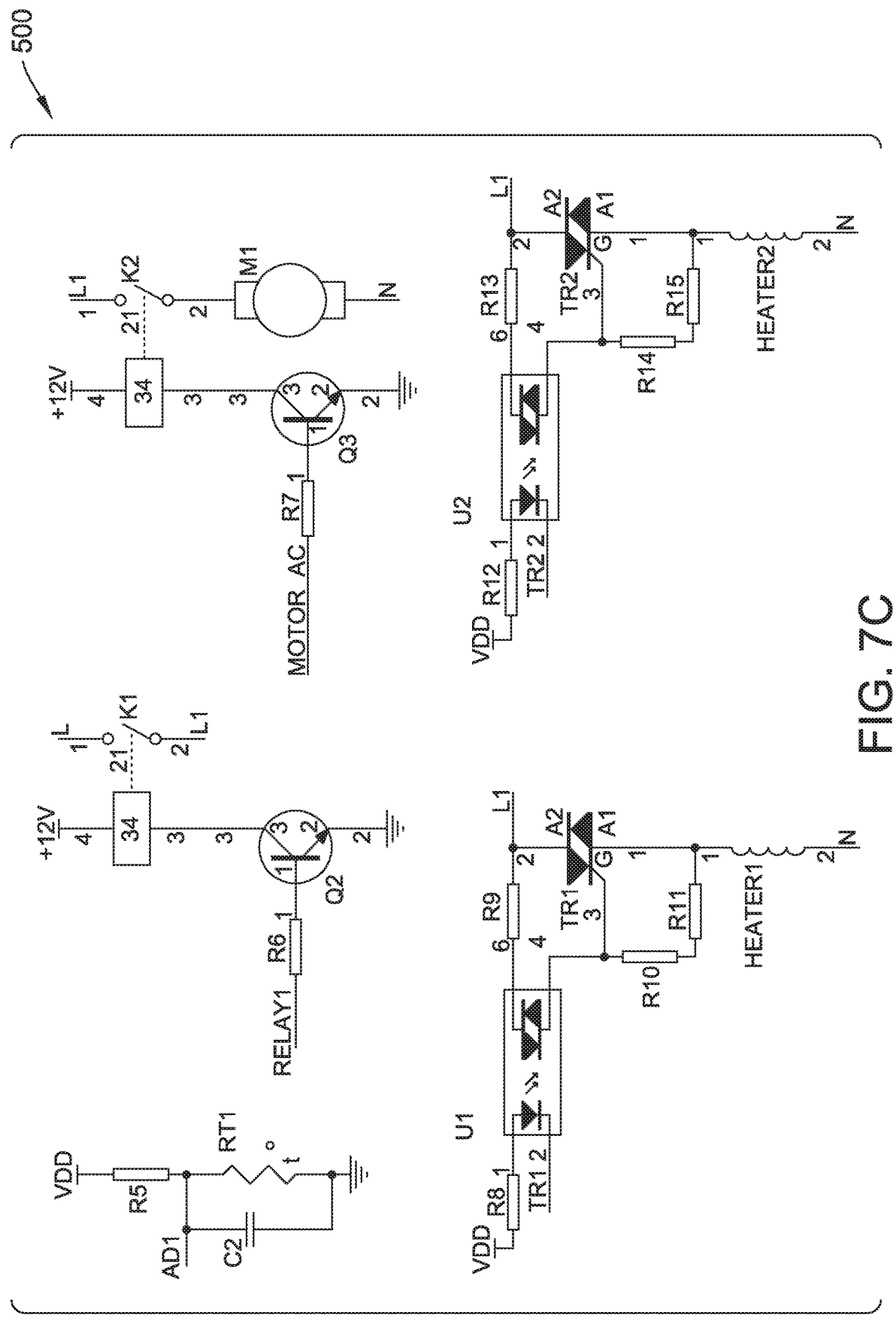
Figure 7D:
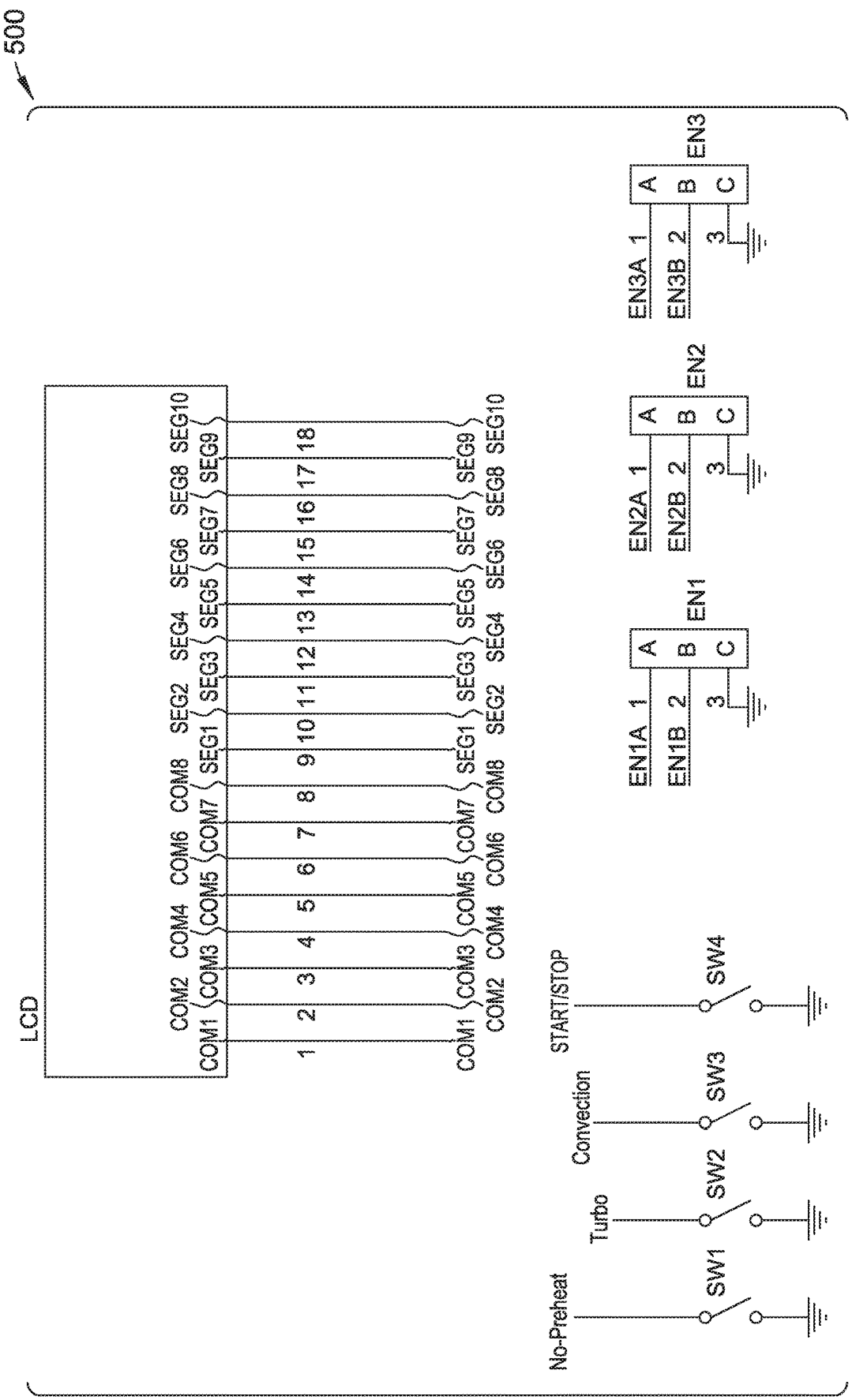
Figure 7E:
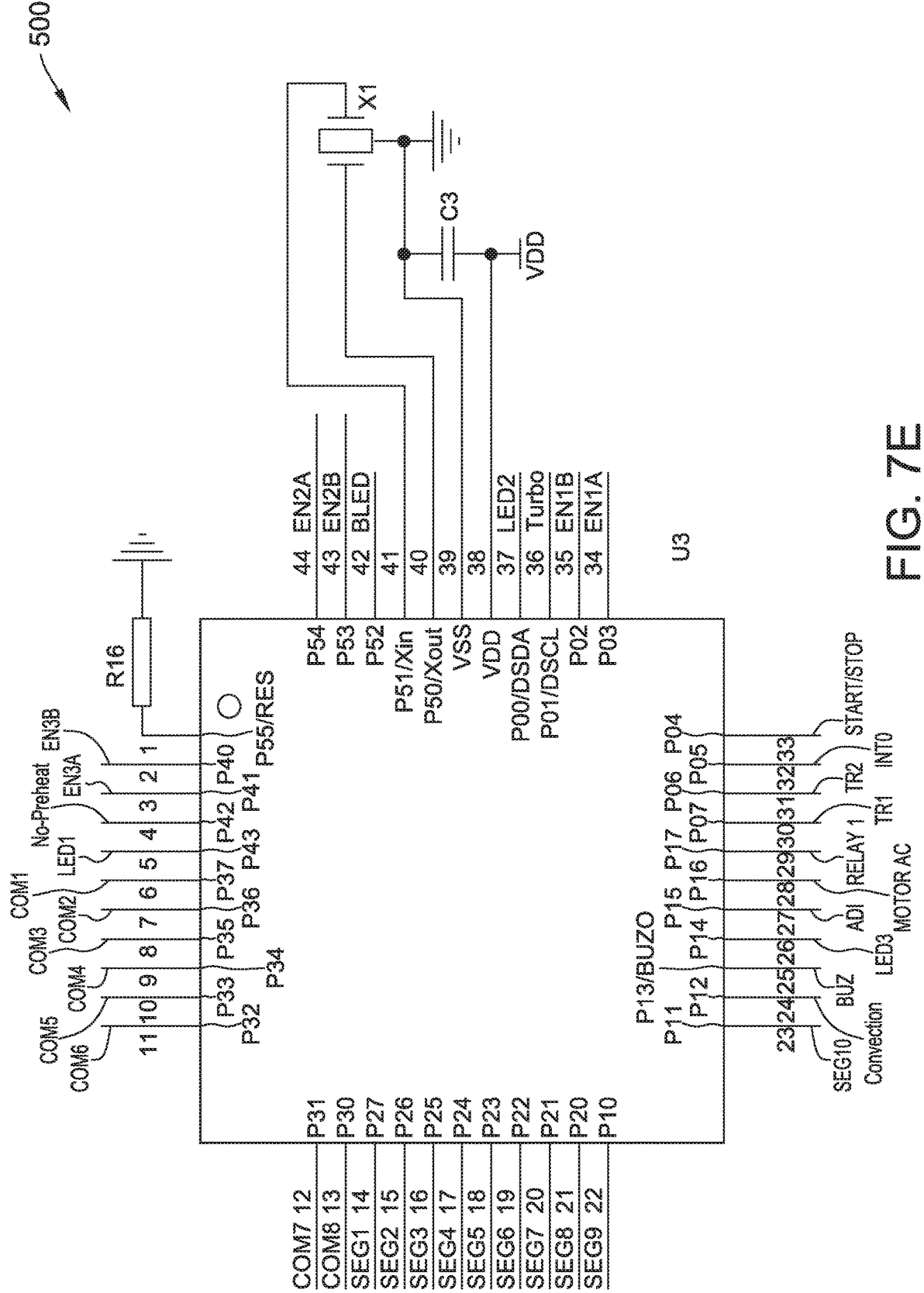
Figure 7F:
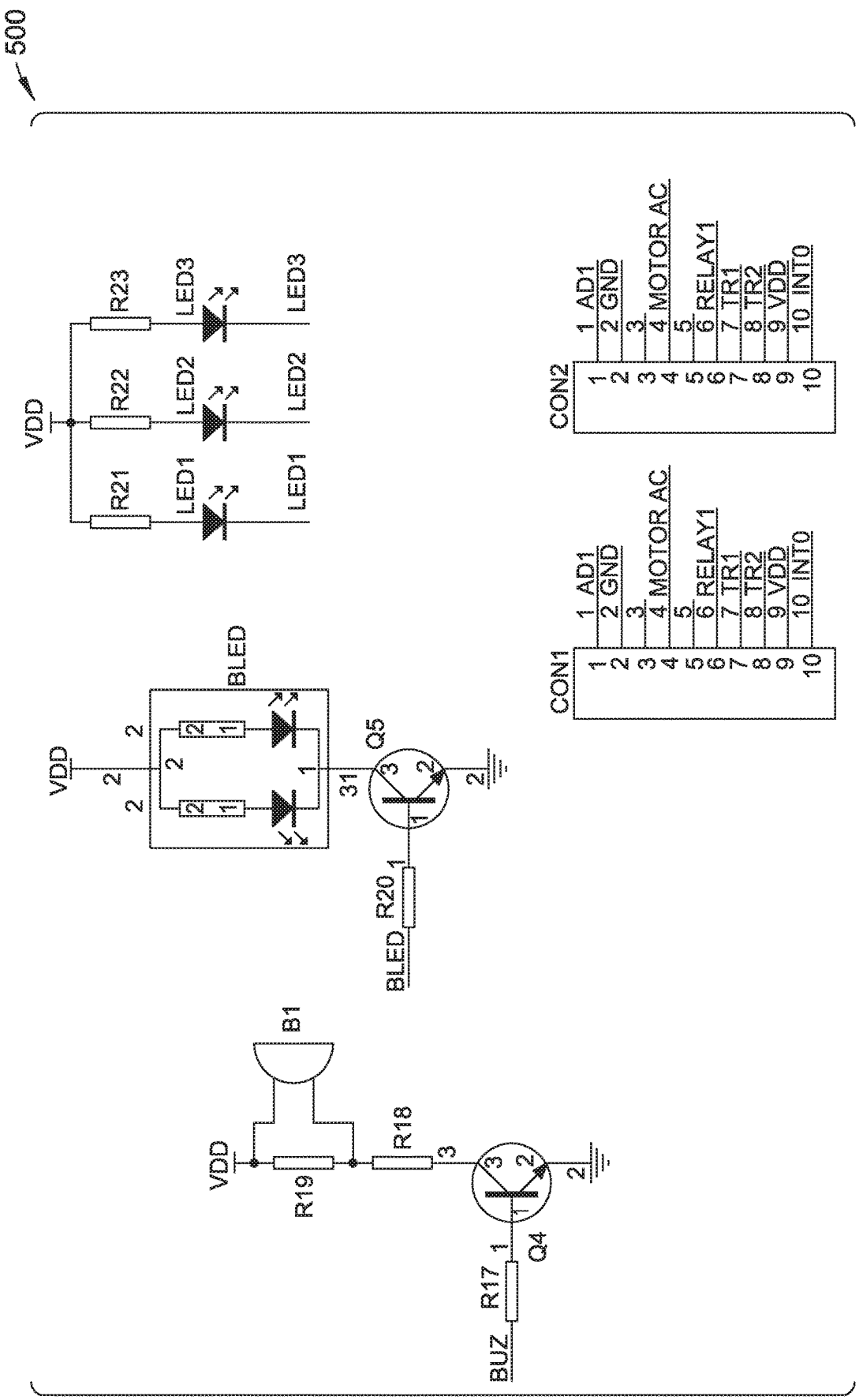

FIG. 6 is a program chart for use by the control unit shown in FIG. 4 to operate the appliance shown in FIG. 1; and FIGS. 7A-F are portions of a wiring diagram together illustrating an electrical circuit for use in the appliance shown in FIG. 1, including a microprocessor with an embedded pulse width modulation (PWM) output to adjust the total amount of electrical current provided to the heating elements 114; an analog PWM switching circuit to modulate the total amount of electrical current provided to the heating elements 114; a TRIAC circuit to adjust the fraction of rated power from one food product to the next (e.g., depending upon the user's cook temperature inputs); and/or a diode to employ a predetermined fraction of rated power.

Corresponding reference characters indicate corresponding parts throughout the several views of the drawings.

DETAILED DESCRIPTION

Figure 2:
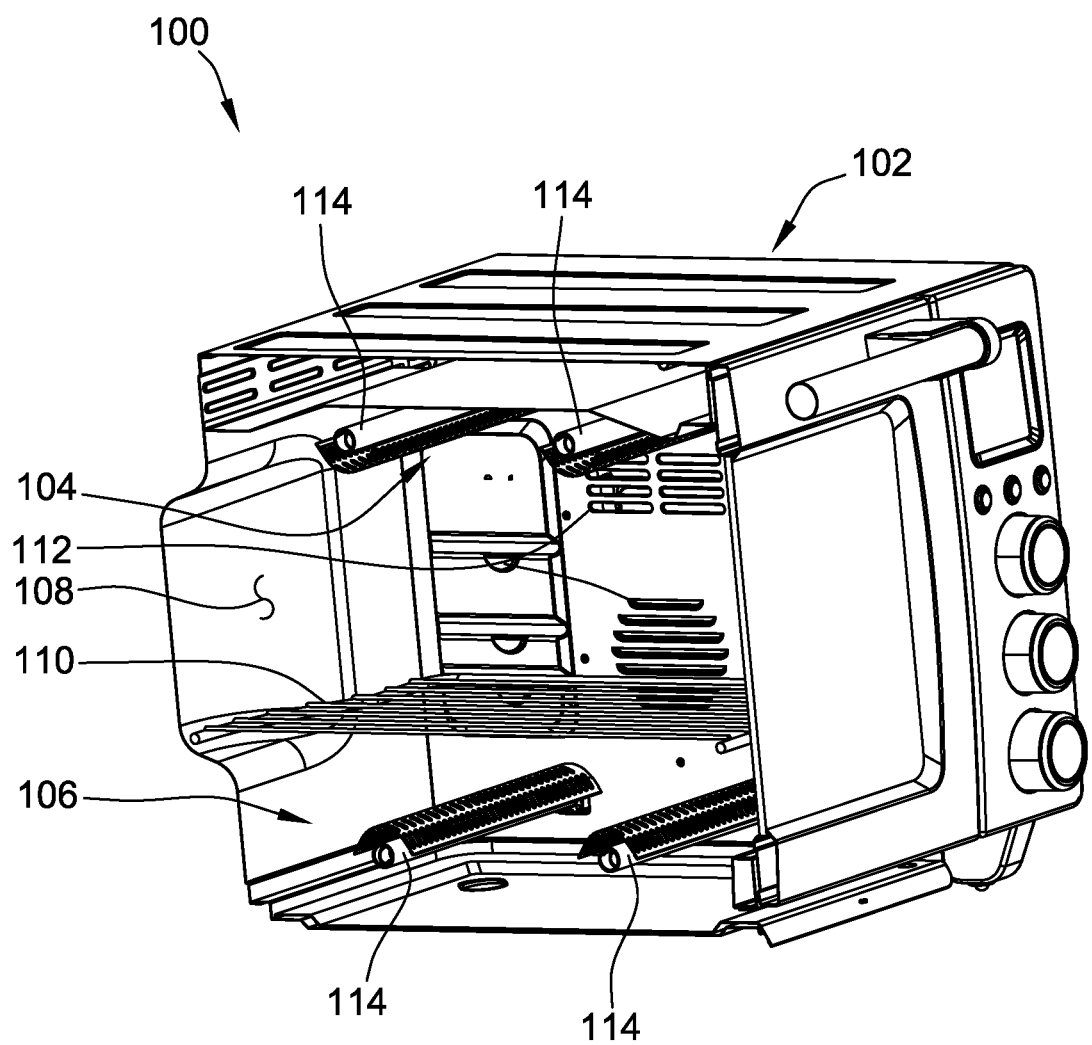
FIG. 2 is a cross-section of the appliance shown in FIG. 1.

Referring now to the drawings, and in particular to FIGS. 1 and 2, a heating appliance (e.g., a toaster oven) according to one embodiment is indicated generally by the reference numeral 100. The illustrated heating appliance 100 comprises a housing (indicated generally at 102), an upper heating assembly (indicated generally at 104), and a lower heating assembly (indicated generally at 106).

The housing 102 defines a food product compartment 108, and the heating assemblies 104, 106 are disposed within the compartment 108 for heating a food product on a rack 110. The appliance 100 also comprises a fan (not shown) that is positioned in flow communication with the compartment 108 via at least one vent 112 such that, when operated, the fan circulates air through the compartment 108. Moreover, the appliance 100 further comprises a user-interface (indicated generally at 116) of a control unit 118 (shown in FIG. 4), and the user-interface 116 is accessible on the exterior of the housing 102 for interacting with the control unit 118 of the appliance 100. The control unit 118 is configured for operating the heating assemblies 104, 106 as set forth in more detail below.

The upper heating assembly 104 is disposed above the rack 110 for heating a food product from above, and the lower heating assembly 106 is disposed below the rack 110 for heating the food product from below. Suitably, the appliance 100 may have any number of heating assemblies arranged in any manner within the compartment 108. For example, in one embodiment, the appliance 100 may have only the upper heating assembly 104, not the lower heating assembly 106; or, in another embodiment, the appliance 100 may have only the lower heating assembly 106, not the upper heating assembly 104.

In the illustrated embodiment, each heating assembly 104, 106 has a pair of heating elements 114. Suitably, in other embodiments, the appliance 100 may have any number of heating elements 114 in each heating assembly 104 and/or 106. For example, in one embodiment, each heating assembly 104 and/or 106 may have only one heating element 114. In another embodiment, each heating assembly 104 and/or 106 may have three, four, or more than four heating elements 114.

Figure 3:
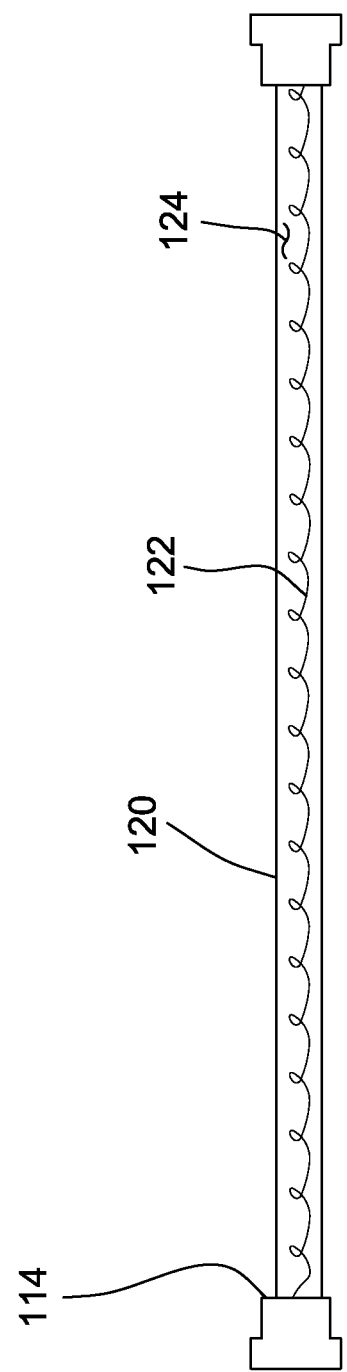
FIG. 3 is a side view of a heating element of the appliance shown in FIG. 2.

Referring now to FIG. 3, each heating element 114 is generally cylindrical and is sized for generally linear extension across the compartment 108. Moreover, each heating element 114 emits radiant energy (e.g., each heating element 114 is an infrared (IR) energy emitting heating element such as, for example, a quartz-type heating element). In this manner, each illustrated heating element 114 has a substantially linearly extending tube 120 with a filament 122 disposed inside, and extending the length of, the tube 120. The filament 122 is a coiled wire fabricated from a tungsten material or nickel-chromium-iron composite material, and the tube 120 is fabricated from a quartz glass material that is transparent, translucent (e.g., frosted), or at least partially coated with a reflective material (e.g., a metallic material) to suit a desired amount (and direction) of infrared energy transmitted through the tube 120. In other suitable embodiments, however, each heating element 114 may be configured in any manner that facilitates enabling the heating element 114 to function as described herein (e.g., the filament 122 of each heating element 114 may not be coiled in some embodiments, or in other embodiments the tube 120 may not extend linearly but, rather, may extend along a curvilinear path).

Moreover, the space 124 surrounding the filament 122 within the tube 120 is open (i.e., the inside of the tube 120 is either under vacuum with gas, or not sealed and exposed to the ambient air). As such, infrared energy emitted from the energized filament 122 is permitted to travel from the filament 122 through the tube 120 with minimal obstruction. Such a configuration of the heating elements 114 is distinguishable from many traditional heating element designs, including a calrod-type heating element in which a filament is surrounded by a powdered material and packed within a metal tube such that radiant energy emitted from the filament is obstructed and absorbed by the powdered material in order to heat the metal tube via conduction.

The illustrated heating elements 114 provide heating properties that are superior to many traditional heating element designs. Each heating element 114 emits more radiant energy in a more focused manner to facilitate better control of energy incidence onto the food product and, therefore, better control of the rate at which the food product is cooked. Thus, while the heating element 114 does in fact heat the air surrounding it, the heating element 114 does not depend on the temperature of the surrounding air in order to drastically speedup or slowdown the cooking process. Rather, with its primary objective being radiant heating, as opposed to convective heating, the heating element 114 can almost instantaneously cause a drastic increase or decrease in the rate at which a food product is cooked. In other words, almost immediately after having been first supplied electrical current, the heating element 114 can drastically increase the rate at which a food product is cooked; and, almost immediately after its supply of current ceases, the heating element 114 can drastically decrease the rate at which a food product is cooked. This enables a more rapid cooking response to the heating element 114 having been turned ON or OFF.

Referring back to FIGS. 1 and 2, the user-interface 116 permits a user to input a variety of cook settings into the appliance 100, so as to provide the control unit 118 with instructions on operating the heating elements 114 and, thereby, cooking the food product. In the exemplary embodiment, the user-interface 116 includes a first button 126, a second button 128, and a third button 130, and the user-interface 116 also includes a first knob 132, a second knob 134, and a third knob 136. Moreover, the user-interface 116 further includes a display 138 and a pair of lights, namely a first (or "now preheating") light 140 and a second (or "now cooking") light 142. However, it is contemplated that the user-interface 116 may be any suitable type of interface, and the examples in the illustrated embodiment are not intended to be limiting on the types of user-interfaces that are possible. Rather, the user-interface 116 may include any combination of button(s) knob(s), dial(s), slide(s), switch (es), display(s), light(s), and/or touchscreen(s) that facilitates enabling a user to operate the appliance 100 as described herein. For example, in some embodiments, various remote user-interfaces are also contemplated for providing the control unit 118 with instructions via the Internet of Things (IoT).

In some instances, food products that are to be cooked prior to consumption have on their packaging a suggested cook time and a suggested cook temperature. Moreover, the packaging often recommends using these suggested settings only when cooking the food products in a convection-based appliance. However, because convection-based appliances rely predominately on the temperature of the air in the compartment to cook a food product, convection-based appliances have various drawbacks to their operation, including the fact that a preheating cycle is needed in order to properly heat the air in the compartment for cooking the food product. This preheating cycle adds time to the overall cooking process, and it would be desirable to provide an appliance that does not need to be preheated to function properly. As used herein, the term "convection-based appliance" refers to an appliance that relies predominately on convection (i.e., the method of heating the air surrounding a food product) in order to cook the food product, while relying on only an incidental amount of radiation to cook the food product.

Many convection-based appliances can function in a "conventional" mode and/or in a "convection" mode, both modes relying predominately on heating the air surrounding a food product in order to cook the food product. The primary functional difference between the conventional mode and the convection mode is that, in the convection mode, the air surrounding the food product is circulated using a fan, while, in the conventional mode, the air surrounding the food product is not circulated using a fan. Nonetheless, convection-based appliances typically need to be preheated in both the conventional mode and the convection mode, which is undesirable in some respects. It should be noted, however, that a food product is typically heated faster in the convection mode than in the conventional mode, due at least in part to the circulation of the heated air surrounding the food product. The packaging of a food product may, therefore, provide a recommended cook time and temperature for use in the conventional mode, and a different recommended cook time and temperature for use in the convection mode.

Convection-based appliances function by varying current flow to their heating elements throughout the overall cooking process in accordance with the temperature of the air in the compartment, as gauged by a thermostat of the appliance. More specifically, it is typical in convection-based appliances for the heating elements to be operated at maximum (i.e., 100%) rated power continuously, without interruption, for the duration of a preheating cycle that ends when a thermostat of the appliance indicates that the air inside the compartment has reached the cook temperature set by the user, and at which time the user is prompted to insert the food product for cooking.

After the preheating cycle has ended, convection-based appliances typically maintain the cook temperature within the compartment by switching between either: (1) providing enough current to the heating elements to operate the heating elements at maximum rated power; or (2) providing no current to the heating elements such that the heating elements are not powered at all. In essence, for a typical convection-based appliance, the heating elements are either powered fully ON or powered fully OFF such that the cook temperature in the compartment is maintained relatively constant. As used herein, the term "maximum rated power" refers to the maximum amount of power output for which the associated heating element is designed, whereas the term "fraction of rated power" refers to less than the maximum amount of power output for which the associated heating element is designed.

As mentioned above, the time required to preheat a typical convection-based appliance is sometimes undesirable, as it lengthens the duration of the overall cooking process. Moreover, the need to preheat a typical convection-based appliance may require the user to perform additional operation(s), in that, after the user starts preheating the appliance, the user may then need to return to the appliance for inserting the food product once the preheating cycle is complete. By contrast, the illustrated appliance 100 is operable, on the one hand, as a convection-based appliance and, on the other hand, as a radiation-based appliance. As set forth in more detail below, this dual-functionality enables the appliance 100 to have operating modes that cook a food product in a more efficient manner by eliminating the need for preheating the compartment 108, thereby shortening the duration of the overall cooking process, while also eliminating the additional user-performed operation(s) that may have otherwise been required for preheating the appliance 100. As used herein, the term "radiation-based appliance" refers to an appliance that relies predominantly on radiation (i.e., the method of emitting radiant energy onto a food product) in order to cook the food product, while relying on only an incidental amount of convection to cook the food product.

Referring now to FIG. 4, as mentioned above, the appliance 100 has a control unit 118 for operating the heating elements 114. The illustrated control unit 118, in some modes, operates the heating elements 114 as if the appliance 100 is a convection-based appliance. More specifically, in some modes, the control unit 118 enables the user to input into the user-interface 116 instructions such as cook time and cook temperature from the packaging of the food product to be cooked, and the control unit 118 then operates the heating elements 114 at maximum rated power until the air inside the compartment 108 has reached the cook temperature input by the user. After reaching the cook temperature, the control unit 118 prompts the user to insert the food product into the compartment 108 and start a timer of the appliance 100, and the control unit 118 begins to modulate between providing no power to the heating elements 114 and providing maximum rated power to the heating elements 114 in order to maintain the compartment 108 at the cook temperature for the duration of the cook time. After the cook time has expired, the control unit 118 prompts the user to remove the food product from the compartment 108.

Notably, the control unit 118 also provides the user with the ability to opt-out of preheating the compartment 108, while nonetheless permitting the user to input instructions as if the user was operating a convection-based appliance (e.g., by permitting the user to input the suggested cook time and cook temperature settings that are provided on the packaging of the food product). As set forth in more detail below, when the user opts-out of preheating the compartment 108, the control unit 118 selectively (i.e., during part or all of the cook time) operates the heating elements 114 as if the appliance 100 is a radiation-based appliance to facilitate cooking the food product within the cook time.

In some such modes, the user-interface 116 permits (and may prompt) a user to insert the food product into the compartment 108 immediately after the control unit 118 has started supplying electrical current to the heating elements 114. In that regard, the control unit 118 regulates (or steps-down) the amount of current provided to the heating elements 114 such that the heating elements 114 are operated at only a fraction of rated power. Because the heating elements 114 are emitting radiant energy over the food product, the heating elements 114 are able to begin cooking the food product almost immediately after electrical current is provided to the heating elements 114. Moreover, because the control unit 118 operates the heating elements 114 at only a fraction of rated power, the heating elements 114 do not overcook or burn the exterior of the food product. Rather, under the influence of the control unit 118, the heating elements 114 perform a controlled cooking operation that heats the interior of the food product without overcooking the exterior of the food product.

For example, in one embodiment, the control unit 118 may provide the heating elements 114 with enough current to operate the heating elements 114 at around 50%-75% of maximum rated power at the outset of, and/or throughout the entire, cooking process. Notably, from the moment at which electrical current is first supplied to the heating elements 114, the control unit 118 will supply continuous, uninterrupted electrical current to the heating elements 114 in order to maintain the heating elements 114 operating at a substantially constant fraction of rated power. Then, when the control unit 118 ultimately determines that the compartment 108 has reached a desired temperature (using data provided by the thermostat of the appliance 100), the control unit 118 begins modulating the electrical current to the heating elements 114 between the following two amounts in order to maintain the air in the compartment at the desired temperature: (1) providing enough current to operate the heating elements 114 at the selected fraction of rated power (e.g., 60% rated power); and (2) providing no (or less) current to the heating elements 114 such that the heating elements 114 are essentially powered down or OFF.

In this manner, the appliance 100 begins cooking the food product immediately after the heating elements 114 have been powered ON (without burning or overcooking the food product), while also maintaining a desired temperature within the compartment 108. Thus, the food product is properly cooked within the cook time input by the user, but the cook time starts immediately such that the additional preheat time that would have otherwise been needed has been eliminated. The food product is, therefore, fully cooked in less time than would have otherwise been needed using a convection-based appliance.

Figure 5:
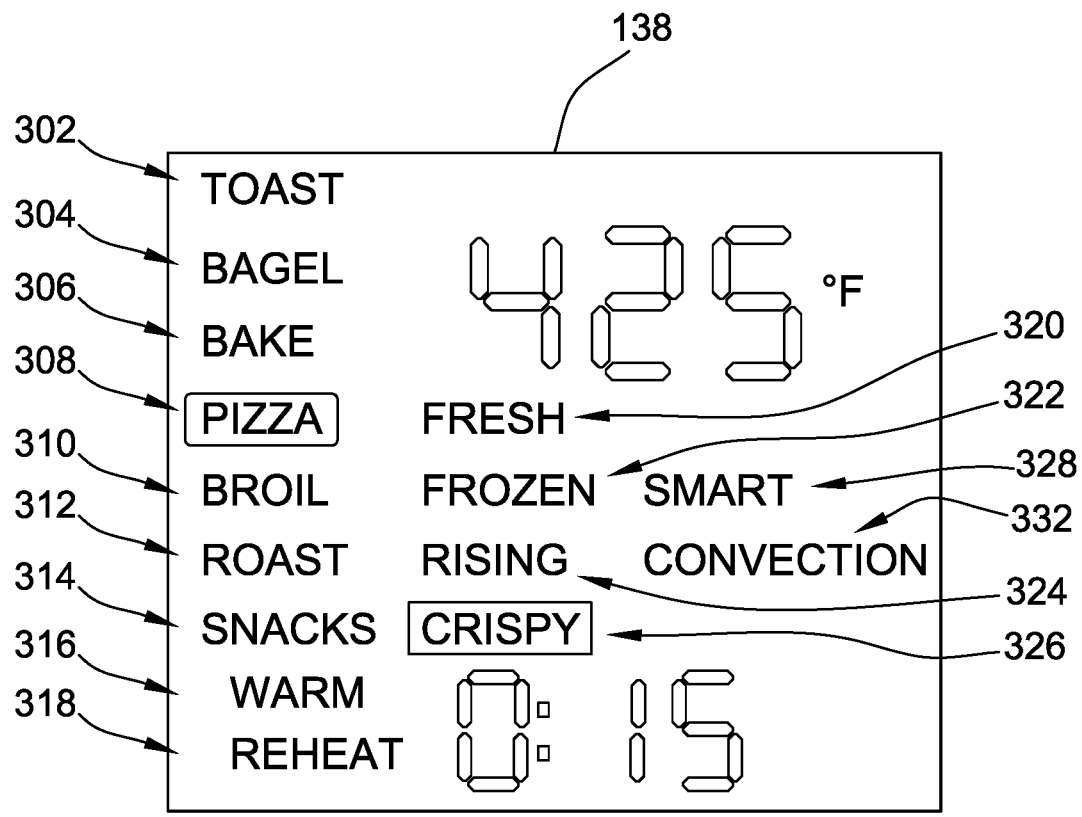
FIG. 5 is a schematic illustration of a display of the appliance shown in FIG. 1 operated by the control unit shown in FIG. 4.

With reference to FIGS. 5 and 6, in one particular embodiment of the appliance 100, each heating element 114 has a maximum rated power of 375 watts. As illustrated in the program chart 300 of FIG. 6, a plurality of different operational programs are available to a user for optimizing the operation of the heating elements 114 to suit the cooking of a variety of different food products. Specifically, the programs available to the user include a "toast" program 302, a "bagel" program 304, a "bake" program 306, a "pizza" program 308, a "broil" program 310, a "roast" program 312, a "snacks" program 314, a "warm" program 316, and a "reheat" program 318. As shown in FIG. 5, these programs 302, 304, 306, 308, 310, 312, 314, 316, 318 are visually displayed to the user by the display 138, and the user is able to scroll through the programs 302, 304, 306, 308, 310, 312, 314, 316, 318 using the first knob 132. Notably, when the pizza program 308 is selected by the user, a plurality of operational sub-programs become available to the user, namely a "fresh" sub-program 320, a "frozen" sub-program 322, a "rising" sub-program 324, and a "crispy" sub-program 326. As shown in FIG. 5, these sub-programs 320, 322, 324, 326 are also visually displayed to the user by the display 138, and the user is able to scroll through the sub-programs 320, 322, 324, 326 using the first knob 132.

Notably, as set forth in more detail below, the control unit 118 may in some of the above programs 302, 304, 306, 308, 310, 312, 314, 316, 318 (or sub-programs) be instructed to operate heating elements 114 in a "preheat" mode (i.e., as if appliance 100 is a convection-based appliance for which a preheating cycle is needed before a food product is inserted into the compartment 108 and a cook time is started). Control unit 118 operates heating elements 114 only at maximum rated power in the preheat mode (i.e., heating elements 114 are either powered fully ON or fully OFF in the preheat mode).

Moreover, the control unit 118 may, in other programs (or sub-programs), be instructed to operate the heating elements 114 in one of two "no-preheat" modes, as if the appliance 100 is a radiation-based appliance for which no preheating cycle is needed before a food product is inserted into the compartment 108 and the cook time is started. Specifically, the control unit 118 may, in some programs, be instructed to operate the heating elements 114 in a "smart" mode 328, in which the heating elements 114 are powered only at a fraction of rated power (i.e., partially ON or fully OFF), and a "turbo" mode 330, in which the heating elements 114 are powered only at maximum rated power (i.e., fully ON or fully OFF).

Optionally, when the appliance 100 is operated in the preheat mode or one of the no-preheat modes, the control unit 118 can be instructed to utilize either a "convection" setting 332, in which the fan circulates air through the compartment 108 via the vents 112, or a "conventional" setting, in which the fan does not circulate air through the compartment 108 via the vents 112. Notably, the smart mode 328 is selectable using the first button 126, the turbo mode 330 is selectable using the second button 128, and the convection setting 332 is selectable using the third button 130.

If the user selects the toast program 302 using the first knob 132, then the smart mode 328, the turbo mode 330, and the convection setting 332 become unavailable as options (i.e., the first button 126, the second button 128, and the third button 130 become inoperable). The user is next prompted to select a toasting level (or shade) using the second knob 134. More specifically, the user is prompted to select either a first (and lightest shade), a second shade, a third shade, a fourth shade, a fifth shade, a sixth shade, or a seventh (and darkest) shade. The user is also prompted to select a number of slices using the third knob 136. More specifically, the user is prompted to select that one slice, two slices, three slices, four slices, five slices, or six slices are to be simultaneously toasted in compartment 108. After the user has selected the desired toasting level and the number of slices to be toasted, the control unit 118 then powers the heating elements 114 of both upper heating assembly 104 and lower heating assembly 106 at their maximum rated power (i.e., at 375 watts each, for a collective 1500 watts of power). The control unit 118 also accesses a look-up table (not shown) stored in its memory to determine a recommended cook time for the toasting level and number of slices input by the user. After determining the recommended cook time, the control unit 118 then starts the timer that is visible on display 138, and illuminates the second light 142 to indicate that cooking has begun and to prompt the user to immediately insert the food product into the compartment 108. After the timer has expired, the control unit 118 suitably prompts the user (e.g., via an audible beep or buzzer) to remove the food product from the compartment 108.

If the user selects the bagel program 304 using the first knob 132, then the smart mode 328, the turbo mode 330, and the convection setting 332 become unavailable as options (i.e., the first button 126, the second button 128, and the third button 130 become inoperable). The user is next prompted to select a toasting level (or shade) using the second knob 134. More specifically, the user is prompted to select either a first (and lightest shade), a second shade, a third shade, a fourth shade, a fifth shade, a sixth shade, or a seventh (and darkest) shade. The user is also prompted to select a number of slices using the third knob 136. More specifically, the user is prompted to select that one slice, two slices, three slices, four slices, five slices, or six slices are to be simultaneously toasted in compartment 108. After the user has selected the desired toasting level and the number of slices to be toasted, the control unit 118 then powers the heating elements 114 of the upper heating assembly 104 at their maximum rated power (i.e., at 375 watts each, for a collective 750 watts of power), but the control unit 118 does not power the heating elements 114 of the lower heating assembly 106 (i.e., the heating elements 114 of the lower heating assembly 106 are powered OFF throughout the entire program). The control unit 118 also accesses a look-up table (not shown) stored in its memory to determine a recommended cook time for the toasting level and number of slices input by the user. After determining the recommended cook time, the control unit 118 then starts a timer that is visible on display 138, and illuminates the second light 142 to indicate that cooking has begun and to prompt the user to immediately insert the food product into the compartment 108. After the timer has expired, the control unit 118 suitably prompts the user (e.g., via an audible beep or buzzer) to remove the food product from the compartment 108.

If the user selects the bake program 306 using the first knob 132, then the smart mode 328, the turbo mode 330, and the convection setting 332 all become available as options (i.e., the first button 126, the second button 128, and the third button 130 all become operable). If the user initially selects the first button 126 to bake in the smart mode 328, then the turbo mode 330 becomes unavailable as an option (i.e., the second button 128 becomes in inoperable) and the convection setting 332 is activated (i.e., the third button 130 becomes inoperable). When baking in the smart mode 328 with the convection setting 332 activated, the user is prompted to input a cook time using the second knob 134 and a cook temperature using the third knob 136 (e.g., the cook time and temperature that are recommended on the food product packaging for use with a convection-based appliance). After inputting the cook time and temperature, the control unit 118 immediately powers the heating elements 114, illuminates the second light 142 to prompt the user to insert the food product into the compartment 108, and starts the timer based on the cook time input by the user.

Because the control unit 118 is not preheating the compartment 108 before the food product is inserted, the control unit 118 accesses a look-up table 400 stored in its memory and determines the associated amount of power at which the heating elements 114 of the upper heating assembly 104 and lower heating assembly 106 should be operated to immediately begin cooking the food product without burning the food product. For example, if the user inputs 350° F. using the second knob 134, then the control unit 118 immediately powers the heating elements 114 of the upper heating assembly 104 and the lower heating assembly 106 to a collective 800 watts (i.e., each heating element 114 is powered at 200 watts) in accordance with the look-up table 400. When the control unit 118 ultimately determines (via data received from the thermostat of the appliance 100) that the temperature of the air within the compartment 108 has reached the cook temperature of 350° F., the control unit 118 then begins to modulate the power of the heating elements 114 to maintain the temperature of the compartment 108 at 350° F. (i.e., the control unit 118 modulates the power of the heating elements 114 between: (1) powering each heating element 114 at 200 watts; and (2) not powering any of the heating elements 114). After the timer has expired, the control unit 118 suitably prompts the user (e.g., via an audible beep or buzzer) to remove the food product from the compartment 108. The manner in which the smart mode 328 is performed above for the bake program 306 is also applicable for other programs, as described below.

Alternatively, if the user initially selects the second button 128 to bake in turbo mode 330, then the smart mode 328 becomes unavailable as an option (i.e., the first button 126 becomes inoperable) and the convection setting 332 is activated (i.e., the third button 130 becomes inoperable). When baking in turbo mode 330 with the convection setting 332 activated, the user is prompted to input a cook time using the second knob 134 and a cook temperature using the third knob 136 (e.g., the cook time and temperature that are recommended on the food product packaging for use with a convection-based appliance). After inputting the cook time and temperature, the control unit 118 immediately powers the heating elements 114 at maximum rated power (i.e., the control unit 118 immediately powers each heating element 114 at 375 watts), illuminates the second light 142 to prompt the user to insert the food product into the compartment 108, and starts the timer based on the cook time input by the user.

When the control unit 118 ultimately determines (via data received from the thermostat of the appliance 100) that the temperature of the air within the compartment 108 has reached the cook temperature input by the user, the control unit 118 then begins to modulate the power of the heating elements 114 to maintain the temperature of the compartment 108 at the cook temperature input by the user (i.e., the control unit 118 modulates the power of the heating elements 114 between: (1) powering each heating element 114 at 375 watts; and (2) not powering any of the heating elements 114). Notably, even though the user entered a cook time, the user is nonetheless instructed to periodically assess the state of the food product and remove the food product from the compartment 108 whenever the desired state is achieved, thereby preventing the food product burning or overcooking. Otherwise, when the timer expires, the control unit 118 suitably prompts the user (e.g., via an audible beep or buzzer) to remove the food product from the compartment 108. The manner in which the turbo mode 330 is performed above for the bake program 306 is also applicable for other programs, as described below.

If, on the other hand, the user does not initially select the first button 126 to bake in the smart mode 328 and does not initially select the second button 128 to bake in the turbo mode 330, then the control unit 118 defaults to the preheat mode. Notably, the convection setting 332 is still available as an option in the preheat mode. If the user selects the third button 130, then the convection setting 332 is activated in the preheat mode. If the user does not select the third button 130, then the control unit 118 defaults to using the conventional setting in the preheat mode, such that the convection setting 332 is deactivated.

When baking in the preheat mode, the user is prompted to input a cook time using the second knob 134 and a cook temperature using the third knob 136 (e.g., the cook time and temperature that are recommended on the food product packaging for use with a convection-based appliance). For example, if the convection setting 332 is activated, the user should input the cook time and temperature recommended on the packaging for cooking with the convection setting 332 of a convection-based appliance. Alternatively, if the convection setting 332 is not activated, the user should input the cook time and temperature recommended on the packaging for cooking with a conventional setting of a convection-based appliance.

After inputting the appropriate cook time and temperature, the control unit 118 immediately powers the heating elements 114 at maximum rated power (i.e., the control unit 118 powers each heating element 114 at 375 watts) and illuminates the first light 140 to indicate that the compartment 108 is preheating, thereby indicating to the user that that the food product should not be inserted into the compartment 108. When the control unit 118 ultimately determines (via data received from the thermostat of the appliance 100) that the temperature of the air within the compartment 108 has reached the cook temperature input by the user, the control unit 118 then darkens the first light 140 to indicate that the preheating cycle is complete, illuminates the second light 142 to prompt the user to insert the food product into the compartment 108, and starts the timer based on the cook time input by the user. The control unit 118 also begins to modulate the power of the heating elements 114 to maintain the temperature of the compartment 108 at the cook temperature input by the user (i.e., the control unit 118 modulates the power of the heating elements 114 between: (1) powering each heating element 114 at 375 watts; and (2) not powering any of the heating elements 114). When the timer expires, the control unit 118 suitably prompts the user (e.g., via an audible beep or buzzer) to remove the food product from the compartment 108. The manner in which the preheat mode is performed above for the bake program 306 is also applicable for other programs, as described below.

If the user selects the pizza program 308 with the fresh sub-program 320 using the first knob 132, then the user is required to cook the food product in the preheat mode, which is performed like the preheat mode described above for the bake program 306. If the user instead selects the frozen sub-program 322, the user has the option of cooking the food product in the smart mode 328 or the turbo mode 330, both of which are performed like the smart mode 328 and the turbo mode 330 described above for the bake program 306, with the exception that in the turbo mode 330 the user is provided the option of deactivating the convection setting 332 (by not selecting or deselecting the third button 130).

If the user selects the pizza program 308 with the rising sub-program 324, then the user is required to cook the food product in the smart mode 328, which is performed like the smart mode 328 described above for the bake program 306. However, rather than accessing the look-up table 400 to determine the appropriate amount of power for the heating elements 114, the control unit 118 powers the heating elements 114 of the upper heating assembly 104 at a collective 675 watts of power (i.e., the control unit 118 powers each heating element 114 of the upper heating assembly 104 at 337.5 watts) and powers the heating elements 114 of the lower assembly 106 at a collective 487.5 watts (i.e., the control unit 118 powers each heating element 114 of the lower heating assembly 106 at 243.75 watts) until the compartment 108 reaches the cook temperature input by the user.

When the control unit 118 ultimately determines that the compartment 108 has reached the cook temperature, the control unit 118 maintains the cook temperature within the compartment 108 by modulating the power of the heating elements 114 between: (1) powering the heating elements 114 of the upper heating assembly 104 at a collective 675 watts and the heating elements 114 of the lower heating assembly 106 at a collective 487.5 watts; and (2) not powering any of the heating elements 114 of the upper heating assembly 104 and powering the heating elements 114 of the lower heating assembly 106 at a collective 262.5 watts (i.e., the control unit 118 powers each heating element 114 of the lower heating assembly 106 at 131.25 watts). Thus, while the heating elements 114 of the upper heating assembly 104 are modulated between fully ON and fully OFF, the heating elements 114 of the lower heating assembly 106 are modulated between partly ON and partly OFF.

If the user selects the pizza program 308 with the crispy sub-program 326, then the user is required to cook the food product in the smart mode 328, which is performed like the smart mode 328 described above for the bake program 306. However, rather than accessing the look-up table 400 to determine the appropriate amount of power for the heating elements 114, the control unit 118 powers the heating elements 114 of the upper heating assembly 104 at a collective 700 watts (i.e., the control unit 118 powers each heating element 114 of the upper heating assembly 104 at 350 watts) and powers the heating elements 114 of the lower heating assembly 106 at a collective 575 watts (i.e., the control unit 118 powers each heating element 114 of the lower heating assembly 106 at 287.5 watts) until the compartment 108 reaches the cook temperature input by the user.

When the control unit 118 ultimately determines that the compartment 108 has reached the cook temperature, the control unit 118 maintains the cook temperature within the compartment 108 by modulating the power supplied to the heating elements 114 between: (1) powering the heating elements 114 of the upper heating assembly 104 at a collective 700 watts and powering the heating elements 114 of the lower heating assembly 106 at a collective 575 watts; and (2) not powering any of the heating elements 114 of the upper heating assembly 104 and powering the heating elements 114 of the lower heating assembly 106 at a collective 575 watts (i.e., the control unit 118 powers each heating element 114 of the lower heating assembly 106 at 287.5 watts). Thus, while the heating elements 114 of the upper heating assembly 104 are modulated ON and OFF, the heating elements 114 of the lower heating assembly 106 are continuously powered at a collective 575 watts throughout the entire sub-program.

If the user selects the broil program 310, none of the smart mode 328, the turbo mode 330, the convection setting 332, and the preheat mode are available as options. Moreover, the user is not able to input a cook temperature using the second knob 134, but rather the control unit 118 visually indicates to the user via the display 138 that the a preset cook temperature of 450° F. is being utilized. The user is, however, prompted to input a cook time using the third knob 136, and the control unit 118 immediately starts the timer and prompts the user to insert the food product into the compartment 108. Notably, the control unit 118 immediately powers the heating elements 114 of the upper heating assembly 104 at a collective 750 watts (i.e., each heating element 114 of the upper heating assembly 104 is powered at 375 watts). Once the control unit 118 determines that the compartment 108 has reached the cook temperature of 450° F., the control unit 118 then modulates the power of the heating elements 114 of the upper heating assembly 104 between: (1) powering the heating elements 114 at a collective 750 watts; and (2) not powering any of the heating elements 114. Once the timer has expired, the control unit prompts the user to remove the food product from the compartment 108. Notably, the control unit 118 does not power the heating elements 114 of the lower heating assembly 106 in the broil program 310.

If the user selects the roast program 312, neither the smart mode 328 nor the turbo mode 330 is available as an option. Rather, the user is required to cook the food product in the preheat mode, which is performed like the preheat mode described above for the bake program 306. If, on the other hand, the user selects either the snacks program 314 or the reheat program 318, neither the smart mode 328 nor the preheat mode is available as an option. Rather, the user is required to cook the food product in the turbo mode 330, which is performed like the turbo mode 330 described above for the bake program 306, with the exception that the convection setting 332 is available as an option (i.e., the user can opt to not activate or deactivate the convection setting 332 to instead cook the food product in the conventional setting).

If the user selects the warm program 316, neither the turbo mode 330 nor the preheat mode are available as options. Rather, the user is required to cook the food product in the smart mode 328, and the convection setting 332 is required to remain deactivated (i.e., the third button 130 becomes inoperable such that the user cannot activate the convection setting 332 using the third button 130). Moreover, the user is not able to input a cook temperature using the second knob 134 but, rather, the control unit 118 visually indicates to the user that a preset cook temperature of 250° F. is being utilized. The user is, however, able to input a cook time using the third knob 136.

After the user inputs the cook time, the control unit 118 immediately powers the heating elements 114 of the upper heating assembly 104 at a collective 375 watts (i.e., the control unit 118 powers each heating element 114 of the upper heating assembly 104 at 187.5 watts) and immediately powers the heating elements 114 of the lower heating assembly 106 at a collective 375 watts (i.e., the control unit 118 powers each heating element 114 of the lower heating assembly 106 at 187.5 watts). The control unit 118 also immediately illuminates the second light 142, starts the timer, and prompts the user to insert the food product into the compartment 108. Once the control unit 118 determines that the compartment 108 has reached the cook temperature of 250° F., the control unit 118 then modulates the power of the heating elements 114 of the upper and lower heating assemblies 104, 106 between: (1) the heating elements 114 being powered at 187.5 watts each; and (2) not powering any of the heating elements 114. When the timer expires, the control unit 118 prompts the user to remove the food product from the compartment 108.

Notably, in some embodiments (e.g., as set forth above for the heating elements 114 of the lower heating assembly 106 during the rising sub-program 324 of the pizza program 308), the control unit 118 may suitably vary the fraction of rated power throughout the cook time that was input by the user. More specifically, the control unit 118 may operate one or more of the heating elements 114 at a first fraction of rated power for a first time interval of the cook time, a second fraction of rated power for a second time interval of the cook time, and a third fraction of rated power for a third time interval of the cook time. Suitably, the first, second, and third fractions of rated power may be different than one another; and/or, the first, second, and third time intervals may be different than one another. For example, the control unit 118 may operate all of the heating elements 114 at: 50% of maximum rated power for the first 5 minutes of the cook time that was input by the user; 60% of maximum rated power for the second 5 minutes of the cook time that was input by the user; and 80% of maximum rated power for the last 1 minute of the cook time that was input by the user (e.g., to sear or broil the food product near the end of the cooking process).

In some embodiments, the functions performed above may involve the use of one or more electronic or computing devices (e.g., the control unit 118). Such devices may suitably include a controller or processing device such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by the controller or processing device, cause the controller or processing device to perform at least some of the method steps described herein. The above examples are exemplary only, and thus are not intended to limit in any way the definition and/or meaning of the terms controller and processing device.

The wiring diagram 500 of FIGS. 7A-F are examples of one suitable electrical circuit for use by the control unit 118 when operating the appliance 100 in the manner set forth above. In some contemplated embodiments, the appliance 100 may suitably include: a microprocessor with an embedded pulse width modulation (PWM) output to adjust the total amount of electrical current provided to the heating elements 114; an analog PWM switching circuit to modulate the total amount of electrical current provided to the heating elements 114; a TRIAC circuit to adjust the fraction of rated power from one food product to the next (e.g., depending upon the user's cook temperature inputs); and/or a diode to employ a predetermined fraction of rated power. Alternatively, the control unit 118 may use any combination of electrical components that facilitates enabling the appliance 100 to function as described herein.

Moreover, a remote (and, in some embodiments, portable) communication device may be configured, such as by suitable programming, to communicate with the control unit 118 of the appliance 100. Specifically, the remote communication device may be configured to receive data from the appliance 100 and display the data to the user. In some embodiments, the remote communication device is configured to allow the user to remotely control at least some aspects of the appliance 100. For example, the remote communication device may be configured to be able to turn the appliance 100 ON and OFF, change/set one or more settings of the appliance 100 (e.g., the cook temperature or the cook time set forth above), and/or instruct the appliance 100 to perform a series of actions.

The remote communication device may be configured to inform and alert a user based on data received from the appliance 100 and/or the user settings. For example, the user can set a timer on the remote communication device to be alerted when a food product should be finished cooking. The remote communication device can also alert the user, based on data received from the appliance 100, when the appliance 100 reaches a specified condition, such as a compartment temperature, or when the food item in the compartment 108 of the appliance 100 reaches a certain internal temperature.

Additional aspects of the present disclosure relate to interactive instructions and/or recipes. The remote communication device can store, import, and/or retrieve recipes that utilize the appliance 100 and instructions for using the appliance 100. Recipes may simply be displayed to the user or may interact with the user and/or the appliance 100 (via the remote communication device). For example, when a user selects an interactive recipe, the input(s) for the appliance 100 to prepare the recipe (e.g., the cook temperature) may be transmitted and applied to the appliance 100. When a recipe includes multiple steps, the interactive recipe may step the user through the steps of the recipe as each step is completed. The remote communication device can determine when a step is completed based on data received from the appliance 100 and/or based on the user indicating that a step is completed.

In this manner, the embodiments described above facilitate providing a radiation-based appliance 100 that efficiently cooks food products in less time than would otherwise be required by a convection-based appliance by eliminating the need for a preheating cycle. Moreover, the above-described appliance 100, which is a radiation-based appliance, permits a user to interact with the appliance 100 as if the appliance 100 was a convection-based appliance, allowing the user during a "no preheat" operating mode of the appliance to input convection-based appliance settings such as the suggested cook temperature and time provided on the packaging of a food product.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A heating appliance for cooking a food product comprising:
   a housing having a compartment, a door for selectively accessing the compartment, and a support for the food product within the compartment, wherein the compartment is sized to receive the food product;
   a heating element disposed within the compartment for cooking the food product, the heating element of a type to predominantly deliver radiation energy; and a control unit for operating the heating element to cook the food product, the control unit including a microprocessor operatively connected to memory with programming for a plurality of cooking processes, the control unit configured to operate the heating element in the plurality of cooking processes including a first cooking process that controls the heating element at a maximum rated power of the heating element throughout a preheat mode and a second cooking process that controls a no preheat mode of a non-preheated appliance within which the heating element is powered at an outset of the second cooking process to the predominantly deliver radiation energy at a fraction of the maximum rated power of the heating element to the food product at a start of a first set cooking time, the fraction of die maximum rated power of the heating element being matched with the food product to be cooked and to start cooking the food product immediately by the predominantly deliver radiation energy.

2. The heating appliance of claim 1, wherein the control unit is operable to permit a user to opt-out of the preheat mode into the no preheat mode.

3. The heating appliance of claim 2, wherein the control unit is operable to permit the user to select a first no preheat mode or a second no preheat mode that is different than the first no preheat mode.

4. The heating appliance of claim 1, wherein the control unit is operable to power the heating element at the maximum rated power in a second no preheat mode.

5. The heating appliance of claim 4, wherein the control unit is operable to begin repeatedly turning the heating element ON and OFF upon receiving an indication that the compartment has reached a set temperature.

6. The heating appliance of claim 1, wherein the control unit also comprises a convection heating cooking process that includes a preheating time period in which the heating element delivers the predominantly deliver radiation energy to the compartment for heating air within the compartment to a set temperature prior to a second set cooking time after which preheat period the heat is modulated on and off to maintain the set temperature during the second set cooking time.

7. The heating appliance of claim 1, wherein the heating element is a quartz-type heating element.

8. The heating appliance of claim 1, further comprising a plurality of the heating elements.

9. The heating appliance of claim 8, wherein the control unit is operable to power all of the heating elements at the same fraction of the maximum rated power.

10. The heating appliance of claim 9, wherein the fraction of the maximum rated power is less than 75% of the maximum rated power.

11. The heating appliance of claim 8, wherein the control unit is operable to simultaneously power each of the heating elements at a different fraction of the maximum rated power of each of the plurality of heating elements, respectively.

12. The heating appliance of claim 1, wherein the control unit is operable to vary the fraction of the maximum rated power from a first fraction of the maximum rated power to a second fraction of the maximum rated power that is different than the first fraction of the maximum rated power when the appliance is being used to cook the food product.

13. A heating appliance comprising:
a housing having a compartment, a door for selectively accessing the compartment, and a support for the food product within the compartment, wherein the compartment is sized to receive the food product;
a radiant heating element to predominantly deliver radiation energy disposed within the compartment;
a user-interface for receiving a cook time input and a cook temperature input from a user; and
a control unit operable to select an amount of electrical current supplied to the heating element, the control unit including a microprocessor operatively connected to memory with programming for a plurality of cooking processes, the control unit configured to operate the heating element in the plurality of cooking processes including a first cooking process that controls the heating element at a maximum rated power of the heating element throughout a preheat mode and a second cooking process that controls a no preheat mode of a non-preheated appliance within which the heating element is powered at an outset of the second cooking process to the predominantly deliver radiation energy at a fraction of the maximum rated power of the heating element to the food product at a selected amount of power at a start of a set cooking time, the fraction of the maximum rated power of the heating element being matched with the food product to be cooked and to start cooking the food product immediately by the predominantly deliver radiation energy.

14. The heating appliance of claim 13, wherein the user-interface is operable for selecting from a plurality of different no-preheat modes.

15. The heating appliance of claim 13, wherein the control unit is operable to power the heating element at the fraction of the maximum rated power in response to the cook temperature input.

16. The heating appliance of claim 15, wherein the control unit is operable to select the fraction of the maximum rated power from a plurality of different fractions of the maximum rated power depending upon the cook temperature input.

17. The heating appliance of claim 15, wherein the control unit is operable to power the heating element at a different fraction of the maximum rated power for each of a plurality of different cook temperature inputs.

18. The heating appliance of claim 15, wherein the control unit is operable to vary the fraction of the maximum rated power from a first fraction of the maximum rated power to a second fraction of the maximum rated power.

* * * * *